(12) United States Patent
Baca et al.

(10) Patent No.: US 10,451,814 B2
(45) Date of Patent: Oct. 22, 2019

(54) FIBER OPTIC CONNECTOR SUB-ASSEMBLIES INCLUDING A BONDING AGENT, ALONG WITH RELATED METHODS

(71) Applicant: Corning Optical Communications LLC, Hickory, NC (US)

(72) Inventors: Adra Smith Baca, Hickory, NC (US); Darrin Max Miller, Hickory, NC (US); Dennis Craig Morrison, Lincolnton, NC (US)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

(21) Appl. No.: 15/686,490

(22) Filed: Aug. 25, 2017

(65) Prior Publication Data

US 2018/0059336 A1 Mar. 1, 2018

Related U.S. Application Data

(60) Provisional application No. 62/415,046, filed on Oct. 31, 2016, provisional application No. 62/380,670, filed on Aug. 29, 2016.

(51) Int. Cl.
*G02B 6/38* (2006.01)
(52) U.S. Cl.
CPC .................. *G02B 6/3861* (2013.01)
(58) Field of Classification Search
CPC .................................................. G02B 6/3861
See application file for complete search history.

(56) References Cited

U.S. PATENT DOCUMENTS

| | | | | |
|---|---|---|---|---|
| 5,048,915 A | * | 9/1991 | Coutts | G02B 6/3861 385/86 |
| 7,147,384 B2 | * | 12/2006 | Hardcastle | G02B 6/3861 385/60 |
| 8,696,215 B1 | | 4/2014 | Fewkes et al. | |
| 8,702,322 B1 | * | 4/2014 | Danley | G02B 6/3833 385/80 |
| 9,429,719 B1 | * | 8/2016 | Danley | G02B 6/3861 |
| 9,568,686 B2 | | 2/2017 | Fewkes et al. | |
| 9,581,768 B1 | | 2/2017 | Baca et al. | |
| 9,588,303 B2 | | 3/2017 | Danley et al. | |
| 9,791,637 B2 | * | 10/2017 | Danley | G02B 6/3861 |
| 2005/0220424 A1 | | 10/2005 | Asano et al. | |

(Continued)

FOREIGN PATENT DOCUMENTS

JP       2014013410 A     1/2014

OTHER PUBLICATIONS

International Search Report and Written Opinion PCT/US2017/046230 dated Nov. 15, 2017.

*Primary Examiner* — Thomas A Hollweg
*Assistant Examiner* — Mary A El-Shammaa
(74) *Attorney, Agent, or Firm* — Adam R. Weeks (57) ABSTRACT

A fiber optic connector sub-assembly includes a ferrule having a front end, a rear end, and a ferrule bore extending between the front and rear ends along a longitudinal axis. The fiber optic connector sub-assembly also includes a bonding agent disposed in the ferrule bore and having first and second ends along the longitudinal axis. The bonding agent has been melted and solidified at the first and second ends.

23 Claims, 3 Drawing Sheets

(56) References Cited

U.S. PATENT DOCUMENTS

| | | | |
|---|---|---|---|
| 2007/0099009 A1* | 5/2007 | Shimizu | C08J 7/047 428/447 |
| 2012/0315001 A1 | 12/2012 | Bexk | |
| 2014/0105550 A1* | 4/2014 | Fewkes | G02B 6/3861 385/80 |
| 2015/0098679 A1* | 4/2015 | Fewkes | G02B 6/3861 385/80 |
| 2015/0301292 A1 | 10/2015 | Danley et al. | |
| 2015/0346452 A1* | 12/2015 | Chien | G02B 6/4497 156/711 |
| 2016/0062054 A1* | 3/2016 | Danley | G02B 6/3833 385/77 |
| 2017/0052328 A1* | 2/2017 | Baca | C09J 171/08 |
| 2018/0059336 A1* | 3/2018 | Baca | G02B 6/3861 |

\* cited by examiner

12:22:24.172 # FIBER OPTIC CONNECTOR SUB-ASSEMBLIES INCLUDING A BONDING AGENT, ALONG WITH RELATED METHODS

CROSS-REFERENCE TO RELATED APPLICATIONS

This application claims the benefit of priority of U.S. Provisional Application No. 62/415,046, filed on Oct. 31, 2016, and U.S. Provisional Application No. 62/380,670, filed on Aug. 29, 2016, the content of both applications being relied upon and incorporated herein by reference in its entirety.

BACKGROUND

This disclosure relates generally to optical connectivity, and more particularly to fiber optic connector sub-assemblies having a ferrule and bonding agent disposed in the ferrule, along with methods of making such sub-assemblies and the bonding agents used therein.

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables. To conveniently provide these connections, fiber optic connectors are often provided on the ends of fiber optic cables. The process of terminating individual optical fibers from a fiber optic cable is referred to as "connectorization." Connectorization can be done in a factory, resulting in a "pre-connectorized" or "pre-terminated" fiber optic cable, or the field (e.g., using a "field-installable fiber optic connector).

Regardless of where installation occurs, a fiber optic connector typically includes a ferrule with one or more bores that receive one or more optical fibers. The ferrule supports and positions the optical fiber(s), which are secured within a bore of the ferrule using a bonding agent. Some bonding agents have been specifically developed to allow "pre-loading" the bonding agent into the ferrule bore prior to a connectorization process. Despite these developments, there remains room for improvement.

SUMMARY

This disclosure relates to a fiber optic connector sub-assembly that includes a ferrule having a front end, a rear end, and a ferrule bore extending between the front and rear ends. The fiber optic connector sub-assembly also includes a bonding agent disposed in the ferrule bore. According to one embodiment, the bonding agent comprises a solid body. At least a first portion of the bonding agent is cylindrical. At least a second portion of the bonding agent is bonded to the ferrule bore.

According to another embodiment, a fiber optic connector sub-assembly includes a ferrule having a front end, a rear end, and a ferrule bore extending between the front and rear ends. The fiber optic connector sub-assembly also includes a bonding agent disposed in the ferrule bore, with the bonding agent comprises a partially cross-linkable polymer resin. At least a first portion of the bonding agent is in the form of a monofilament, and at least a second portion of the bonding agent has been melted and solidified to bond to the ferrule bore. The at least a second portion of the bonding agent can be re-melted and heated above a cross-linking temperature to irreversibly cross-link and solidify.

According to another embodiment, a fiber optic connector sub-assembly includes a ferrule having a front end, a rear end, and a ferrule bore extending between the front and rear ends. The fiber optic connector sub-assembly also includes a bonding agent at least partially disposed in a region of the ferrule bore that has an inner diameter. At least a first portion of the bonding agent is cylindrical and has an outer diameter that is less than the inner diameter of the region of the ferrule bore in which the bonding agent is at least partially disposed. At least a second portion of the bonding agent is bonded to the ferrule bore.

According to another embodiment, a fiber optic connector sub-assembly includes a ferrule having a front end, a rear end, and a ferrule bore extending between the front and rear ends. The fiber optic connector sub-assembly also includes a bonding agent at least partially disposed in a region of the ferrule bore that has an inner surface. The bonding agent comprises a solid body. A gap is defined between an outer surface of the bonding agent and the inner surface of the region of the ferrule bore in which the bonding agent is at least partially disposed, but at least a portion of the bonding agent is bonded to the inner surface.

According to another embodiment, a fiber optic connector sub-assembly includes a ferrule having a front end, a rear end, and a ferrule bore extending between the front and rear ends. The ferrule bore includes a counter-bore section extending inwardly from the rear end of the ferrule, a micro-hole section extending inwardly from the front end of the ferrule, and a transition section located between the counter-bore section and the micro-hole section. The fiber optic connector sub-assembly also includes a bonding agent at least partially disposed in the counter-bore section of the ferrule bore. At least a first portion of the bonding agent is cylindrical and has an outer diameter greater than the micro-hole diameter, and at least a second portion of the bonding agent is bonded to an inner surface of the counter-bore section of the ferrule bore.

Methods of making a fiber optic connector sub-assembly are also disclosed. The fiber optic sub-assembly includes a ferrule having a front end, a rear end, a ferrule bore extending between the front and rear ends. According to one embodiment, a method comprises: (a) initially disposing a bonding agent that is in the form of a monofilament in the ferrule bore; (b) heating at least a portion of the ferrule above a melting temperature of the bonding agent initially disposed in the ferrule bore so that some of the bonding agent melts; and (c) solidifying the bonding agent that has melted.

Methods of forming a bonding agent for a fiber optic connector sub-assembly are also disclosed, wherein the bonding agent comprises a partially cross-linkable resin. According to one embodiment, such a method comprises: (a) loading the bonding agent as a powdered material into an extruder; (b) melting and extruding the bonding agent to form a monofilament of the bonding agent; (c) passing the monofilament bonding agent through a warm water or air cooling trough after the monofilament exits the extruder; (d) heating the monofilament bonding agent above a glass transition temperature of the bonding agent after step; (e) applying tension to heated monofilament bonding agent from step (d) to draw the monofilament bonding agent into a desired cylindrical shape.

Additional features will be set forth in the detailed description which follows, and in part will be readily apparent to those skilled in the technical field of optical communications. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Persons skilled in the technical field of optical connectivity will appreciate how features and attributes associated with embodiments shown in one of the drawings may be applied to embodiments shown in others of the drawings.

DETAILED DESCRIPTION

Figure 1:
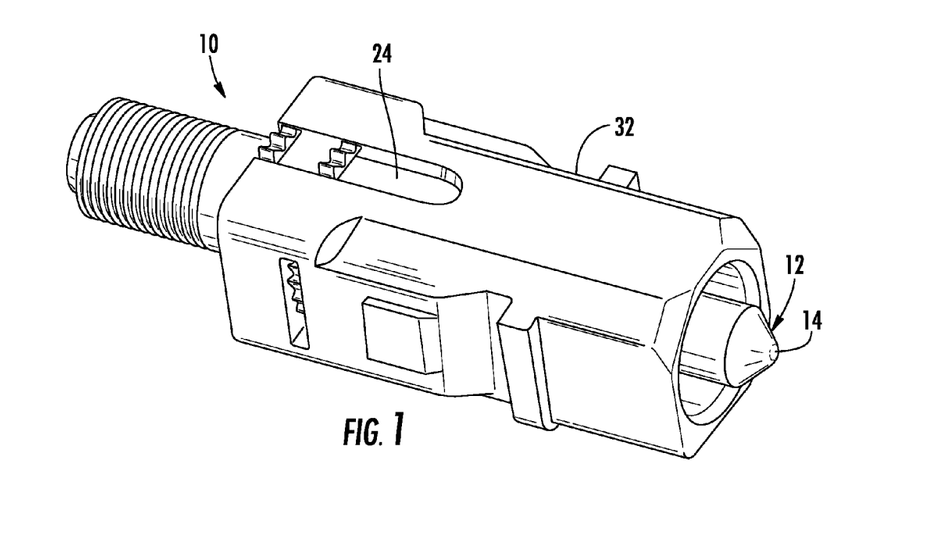
FIG. 1 a perspective view of an example of a fiber optic connector.

Various embodiments will be further clarified by examples in the description below. In general, the description relates to fiber optic connector sub-assemblies and methods of making the same. The sub-assemblies and methods may facilitate the cable assembly process for a fiber optic cable. That is, the sub-assemblies and methods may be initial steps to facilitate terminating one or more optical fibers from a fiber optic cable with a fiber optic connector to form a cable assembly. One example of a fiber optic connector (also referred to as "optical connector 10", or simply "connector 10") for such a cable assembly is shown in FIG. 1. Although the connector 10 is shown in the form of a SC-type connector, the methods described below may be applicable to processes involving different fiber optic connector designs. This includes ST, LC, FC, MU, and MPO-type connectors, for example, and other single-fiber or multi-fiber connector designs. A general overview of the connector 10 will be provided simply to facilitate discussion.

Figure 2:
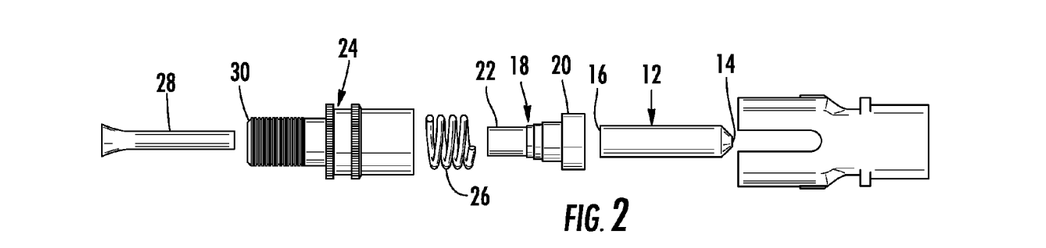
FIG. 2 is an exploded side view the fiber optic connector of FIG. 1.

As shown in FIGS. 1 and 2, the connector 10 includes a ferrule 12 having a front end 14 ("mating end") and rear end 16 ("insertion end"), a ferrule holder 18 having opposed first and second end portions 20, 22, and a housing 24 (also referred to as "inner housing 24" or "connector body 24"). The rear end 14 of the ferrule 12 is received in the first end portion 20 of the ferrule holder 18 while the front end 14 remains outside the ferrule holder 18. The second end portion 22 of the ferrule holder 18 is received in the housing 24. A spring 26 may be disposed around the second end portion 22 and configured to interact with walls of the housing 24 to bias the ferrule holder 18 (and ferrule 12). Additionally, a lead-in tube 28 may extend from a rear end of the housing 24 to within the second end portion 22 of the ferrule holder 18 to help guide the insertion of an optical fiber (not shown in FIGS. 1 and 2) into the ferrule 12. An outer shroud 32 (also referred to as "outer housing 32") is positioned over the assembled ferrule 12, ferrule holder 18, and housing 24, with the overall configuration being such that the front end 16 of the ferrule 12 presents an end face configured to contact a mating component (e.g., another fiber optic connector; not shown).

In a manner not shown herein, a fiber optic cable providing the optical fiber also includes one or more layers of material (e.g., strength layer of aramid yarn) that may be crimped onto a rear end portion 30 of the housing 24, which is why the housing 24 may also be referred to as a "crimp body" or "retention body". A crimp band (or "crimp ring") may be provided for this purpose. Additionally, a strain-relieving boot may be placed over the crimped region and extend rearwardly to cover a portion of the fiber optic cable. Variations of these aspects will be appreciated by persons familiar with the design of fiber optic cable assemblies. For example, other ways of securing a fiber optic cable to the housing 24 are also known and may be employed in some embodiments. Again, the embodiment shown in FIGS. 1 and 2 is merely an example of a fiber optic connector to which the fiber optic connector sub-assemblies and methods provided in this disclosure may relate.

Figure 3:
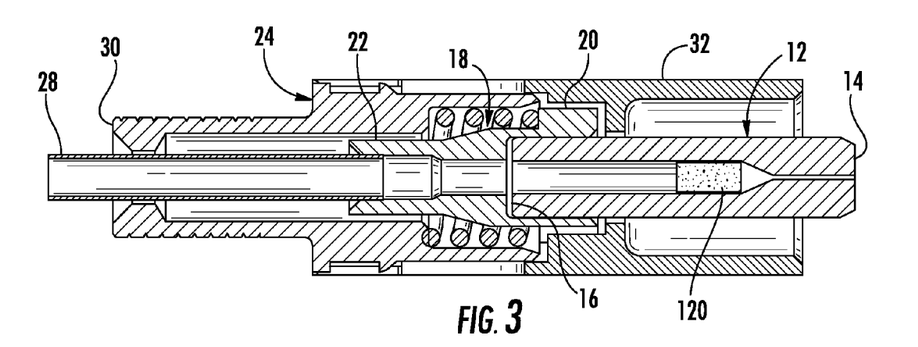
FIG. 3 is a cross-sectional view of a fiber optic connector according to another embodiment.
Figure 4:
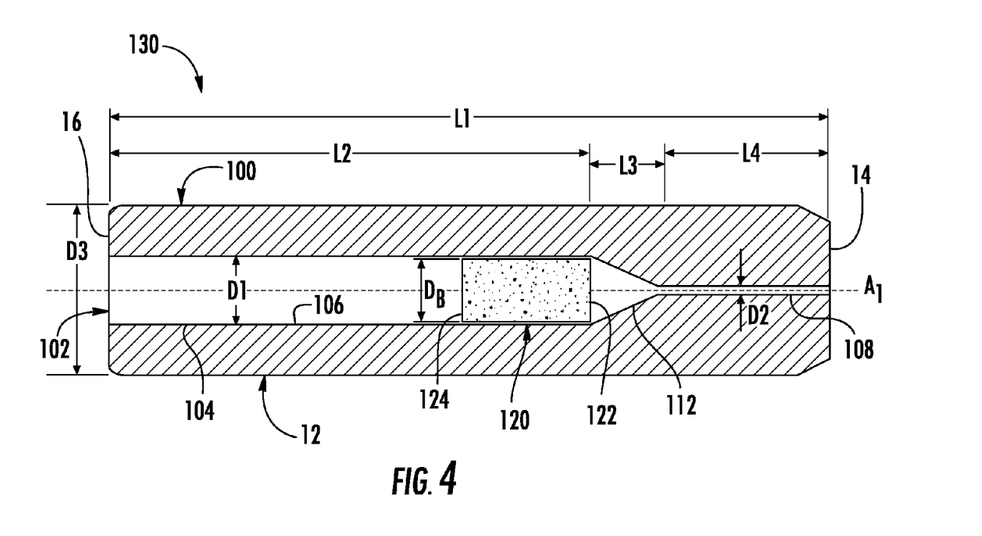
FIG. 4 is a cross-sectional view of an example of a fiber optic connector sub-assembly for the fiber optic connector of FIG. 2, wherein the fiber optic connector sub-assembly includes a ferrule and a bonding agent disposed in a ferrule bore of the ferrule.

FIG. 3 illustrates the connector 10 in further detail, and FIG. 4 is an enlarged view of the ferrule 12 in isolation. The ferrule 12 may be the same as that described in U.S. Pat. No. 8,702,322 ("the '322 patent"), which describes many details related to the geometry of the ferrule, the location of a bonding agent within a bore of the ferrule, and possible compositions for the bonding agent, this information being incorporated herein by reference. In general, the ferrule 12 includes a ferrule bore 102 extending between the front and rear ends 14, 16 along a longitudinal axis A1. More specifically, the ferrule bore 102 has a first section 104 (also referred to as "counter-bore section") extending inwardly from the rear end 16 of the ferrule 12, a second section 108 (also referred to as "micro-hole" or "micro-hole section") extending inwardly from the front end 14 of the ferrule 12, and a transition section 112 located between the first section 104 and the second section 108. The first, second, and transition sections 104, 108, 112 have respective lengths L1, L2, and L3 measured along or parallel to the longitudinal axis A1. The front and rear ends 14, 16 define respective front and rear end faces of the ferrule 12 that extend in planes parallel or substantially parallel to each other but substantially perpendicular to the longitudinal axis A1. In some embodiments, the front end face may be at a slight angle relative to the longitudinal axis A1 to provide, for example, an angled physical contact (APC) end face.

Still referring to FIGS. 3 and 4, the first section 104 of the ferrule bore 102 has a first width, and the second section 108 has a second width less than the first width such that the transition section 112 provides a decrease in width between the first section 104 and second section 108. More specifically, in the embodiment shown, the first section 104 of the ferrule bore 102 is a cylindrical bore extending from the rear end 16 of the ferrule 12 to the transition section 112 such that the first width is a first diameter D1. The second section 108 of the ferrule bore 102 is a cylindrical bore extending from the front end 14 of the ferrule 12 to the transition section 112 such that the second width is a second diameter D2. Accordingly, the transition section 112 provides a decrease in diameter between the first section 104 and second section 108.

As shown in FIGS. 3 and 4, a bonding agent 120 is located in the ferrule bore 102. The bonding agent 120 may be pre-loaded or stored within the ferrule 100 for a significant amount of time (e.g., at least an hour, a day, a year, etc.) before inserting an optical fiber into the ferrule bore 102. For example, as mentioned above, the bonding agent 120 may be pre-loaded into the ferrule bore 102 by the manufacturer of the ferrule 100. The combination of the ferrule 12 and bonding agent 120 pre-loaded therein represents a fiber optic connector sub-assembly 130.

The '322 patent describes how the bonding agent 120 may be a free-flowing powder material coupled within the transition section 112 of the ferrule bore 102 via compression. Although the '322 patent also mentions that the bonding agent 120 may alternatively be extruded, there are no details provided on how to do so. Applicant has discovered ways to address various challenges that may be encountered when extruding bonding agents, and ways to effectively load extruded bonding agents into the ferrule bore 102. These details will be described below. First, however, exemplary bonding agents will be summarized to provide additional context for the disclosure.

Exemplary Bonding Agents

Although the discussion of possible bonding agents in the '322 patent have been incorporated herein by reference, additional details relating to such bonding agents can be found in U.S. Pat. No. 8,696,215 ("the '215 patent") and U.S. Patent Application Pub. No. 2015/0098679 ("the '679 publication"), such details also being incorporated herein by reference. Some information from the '322 patent and/or the '215 patent and '679 publication is summarized below for quick reference.

The bonding agents in the '322 patent, the '215 patent, and '679 publication are configured to be heated and cooled relatively quickly to facilitate the termination process of a fiber optic cable, yet are also configured to provide sufficient coupling between the optical fiber(s) of a fiber optical cable and the ferrule bore. One specific example of the bonding agent is one that comprises a partially cross-linked polymer resin and a coupling agent that provides chemical coupling between the polymer resin and optical fiber(s), the ferrule, or both. The presence of the coupling agent allows the polymer resin to be selected primarily for heating and cooling properties rather than adhesion properties. The bonding agent may even comprise a majority of the polymer resin so as to be largely characterized by the heating and cooling properties of the polymer resin. For example, the bonding agent may comprise between about 0.1 to about 10 parts by weight of the coupling agent per 100 parts by weight of the partially cross-linked polymer resin.

As used herein, "cross-linked" or "cross-linking" refers to the chemical bonding that connects a polymer chain to an adjacent polymer chain; "partially cross-linked" is where not all adjacent chains are bonded; and "partially cross-linkable" describes a chemical species that becomes partially cross-linked when sufficient heat is applied. It should be understood that the terms "partially cross-linked" and "partially cross-linkable" describe the same polymer resin before or after partially cross-linking. For example, a polymer resin may be described as partially cross-linkable when it is loaded into a ferrule and has not yet been heated to a temperature that results in the polymer resin partially or completely cross-linking.

One example of a partially cross-linkable polymer resin with desirable heating and cooling characteristics is polyphenylene sulfide. One example of a coupling agent having desirable adhesion characteristics is a coupling agent having a silane functional group, such as one or more of the following: an alkoxysilane, an oxime silane, an acetoxy silane, a zirconate, a titanate, a silane with an epoxy ring on one end and trimethoxy functional group at the other end, or combinations thereof. Other examples of partially cross-linkable polymers, coupling agents, and bonding agents are described in the '322 patent, '215 patent, and '679 publication.

The partially cross-linkable polymer resin of the bonding agent has a melting temperature less than the cross-linking temperature. For example, the partially cross-linkable polymer resins above may each have a melting point at temperatures of less than 250° C., 270° C., or 290° C., yet each have a cross-linking temperature (i.e., the temperature at which the resin materials cross-link in the presence of air) of at least 300° C., 325° C., or even 350° C.

As mentioned above, the bonding agent may be a free-flowing powder material at some point. The powder may bay a result of grinding various components of the bonding agent (e.g., the partially cross-linkable resin) that are initially solid in to respective powders, and then mixing powders thoroughly together. Some components of the bonding agent (e.g., the coupling agent) may be a liquid, but the fraction such components in the blend may be relatively small (e.g., less than 10 parts by weight of the overall blend) so that the resulting blend is still considered a free-flowing powder. For example, in one embodiment, the coupling agent may be pre-reacted with the thermoplastic powders in an organic solvent under refluxing conditions. After removal of the solvent, the treated powder remains. Under the conditions of refluxing solvent, some of the coupling agent may have become permanently bonded to the polymer.

Forming a Fiber Optic Connector Sub-Assembly with a Monofilament Bonding Agent

Having mentioned exemplary bonding agents, a method of making the fiber optic connector sub-assembly 130 will now be described. First the bonding agent 120 is made in a particular physical form to facilitate handling and loading into the ferrule 12. In particular, the bonding agent 120 is made as a monofilament. This means that the bonding agent 120 has been melted, extruded, and cooled in some manner to result in a solid preform/body. The bonding agent 120 may have already been prepared as a powder (see example above) before being melted. Alternatively, the polymer resin of the bonding agent 120 may be melted and mixed with other components (e.g., a coupling agent) in the melted state to form the melted bonding agent. Either way, the heat applied to form the melted bonding agent is kept sufficiently low to avoid substantial cross-linking in the polymer resin of the bonding agent (e.g., kept below 350° C., 325° C., or even 300° C. when the polymer resin comprises polyphenylene sulfide). While the mixture remains melted/flowable, the mixture is then extruded.

Advantageously, the melting and extruding may be performed by the same device. For example, the bonding agent 120 may be initially prepared as a powder and loaded into a twin screw extruder (not shown), which heats and mixes the bonding agent as before bonding agent moved through an extrusion die.

Extruding the bonding agent can be a challenge when the polymer in the bonding agent has a relatively low melt strength, which can make it difficult to achieve consistent/desired shapes and uniformity in the monofilament. The low melt strength may be largely due to the polymer having low molecular weight. This can be the case for polyphenylene sulfide, the example polymer mentioned above.

One way to address the challenges associated with low melt strength is to configure the extrusion die so that the bonding agent exits the die at a 90° angle directly into either air or a warm water cooling trough. Cooling the bonding agent in this manner may help minimize the formation of trapped air that might otherwise be present from rapid cooling in a cold water trough or the like. However, the cooling is still sufficient to help maintain the monofilament form and enable the bonding agent to be subsequently handled or otherwise processed as a monofilament despite the low melt strength. For example, once cooled by the air or warm water trough, the monofilament bonding agent may be passed through a heating area to bring the temperature of the bonding agent back above a glass transition temperature (e.g., above 80° C., above 90° C., or even above 100° C.). The temperature may be kept with 25%, within 15%, or even within 10% of the glass transition temperature. Tension may also be applied to redraw the monofilament to a desired and consistent diameter.

The result of the example process above may be a monofilament of the bonding agent that has a substantially uniform shape (e.g., a cylinder with a substantially constant diameter) with substantially uniform properties and/or is substantially homogeneous. As mentioned above, the term "monofilament" in this disclosure means that the bonding agent has been melted, extruded, and cooled in some manner to result in a solid preform body. The term does not preclude post-processing following extrusion; a solid preform body with a substantially constant shape is all that is required.

The monofilament bonding agent can ultimately be cut into a desired length for the fiber optic connector sub-assembly 130 (FIG. 4) and loaded into the ferrule bore 102. As shown in FIG. 4, the bonding agent 120 has an outer diameter $D_B$ that is less than the diameter D1 of the first section 104 of the ferrule bore 102 (D1 is an inner diameter of the ferrule 12/outer diameter of the ferrule bore 102). The difference is sufficiently large to enable easy insertion of the monofilament bonding agent (e.g., in light of dimensional tolerances for the ferrule bore 102), yet sufficiently small to avoid substantial gaps between the bonding agent 12 and an inner surface 106 of the first section 104 when the bonding agent 120 is heated and used to secure an optical fiber in the ferrule bore 102. As an example, the difference $D_B$–D1 results in a gap G, and in some embodiments 0<G<0.15*D1. In other embodiments, G is between 0.5-12% of D1 (i.e., 0.05*D1<G<0.12*D1), or even between 1-9% of D1 (i.e., 0.01*D1<G<0.09*D1). As a specific example, when the first section 104 has a diameter D1 of 0.42 mm, $D_B$ may be 0.40 mm such that the gap G is 0.02 mm. Accounting for tolerances in this specific example, D1 may be 0.42±0.005 mm and $D_B$ may be 0.40±0.01 mm such that the gap G may between 0.005-0.035 mm (1.2-8.3% of D1).

Still referring to FIG. 4, the bonding agent 120 formed as a monofilament may be loaded into the ferrule bore 102 from the rear end 16 of the ferrule 12 and advanced until a first end 122 of the bonding agent 120 is located in the transition section 112. The reduced diameter of the transition section 112 prevents the bonding agent 120 from being advanced further. Although force may be applied when loading the bonding agent 120 to create an interference fit between the first end 122 of the bonding agent 120 and the transition section 112, the interference may not be sufficient to keep the bonding agent 120 in place during subsequent handling of the fiber optic connector sub-assembly 130. The period of time between forming the fiber optic connector sub-assembly 130 and the time when the bonding agent 120 is heated to secure an optical fiber in the ferrule bore may be significant (e.g., at least a day, a week, a month, or even a year). And during this period, the fiber optic connector sub-assembly 130 may be extensively handled (e.g., polished or otherwise processed, transported, stored, etc.).

Figure 5:
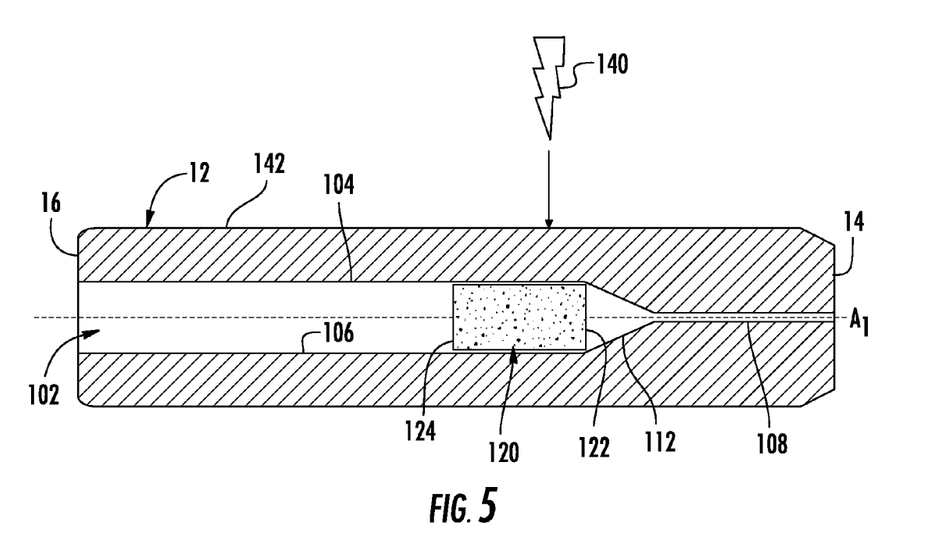
FIG. 5 is a cross-sectional view similar to FIG. 4, but schematically illustrates a portion of the ferrule being heated so that at least some of the bonding melts.

To reduce the likelihood of the monofilament bonding agent 120 becoming displaced or even dislodged from the ferrule 12 during handling of the fiber optic connector sub-assembly 130, steps may be taken to bond at least some of the bonding agent 120 to the ferrule bore 102. In particular, at least a portion of the ferrule 12 may be heated above a melting temperature of the bonding agent 120. FIG. 5 schematically illustrates the ferrule 12 being heated at a first location by a heating source 140. The first location may generally correspond to or otherwise include a location in the ferrule bore 102 where the bonding agent 120 is located (i.e., the first location may be a location on an outer surface 142 of the ferrule 12 that is substantially the same distance from the front end 14 as a location on the bonding agent 120). To this end, in the embodiment shown, the first location is a location on the ferrule 12 that includes the first section 104.

The heating source 140 in FIG. 5 is shown in a generic manner because any suitable heating source may be used to heat the ferrule 12. For example, the heating source 140 may comprise one or more lasers that irradiate the outer surface 142 of the ferrule 12. Alternatively, the heating source 140 may represent a heated sleeve or other cartridge-like heater into which the ferrule 12 is inserted. Other example heating sources not shown include an oven or a resistive wire wrapped around the ferrule 12. There may be a single heating source 140 or multiple heating sources 140, depending on the particular embodiment. Furthermore, although FIG. 5 illustrates the ferrule 12 being heated only at a first location, the first location may represent a region of the ferrule 12 (i.e., a partial length of the ferrule 12) in some embodiments. Additionally or alternatively, the ferrule 12 may be heated at multiple locations. The ferrule 12 may be rotated, translated, or otherwise moved relative to the heating source 140, or vice-versa, during the heating process, if desired.

Figure 6:
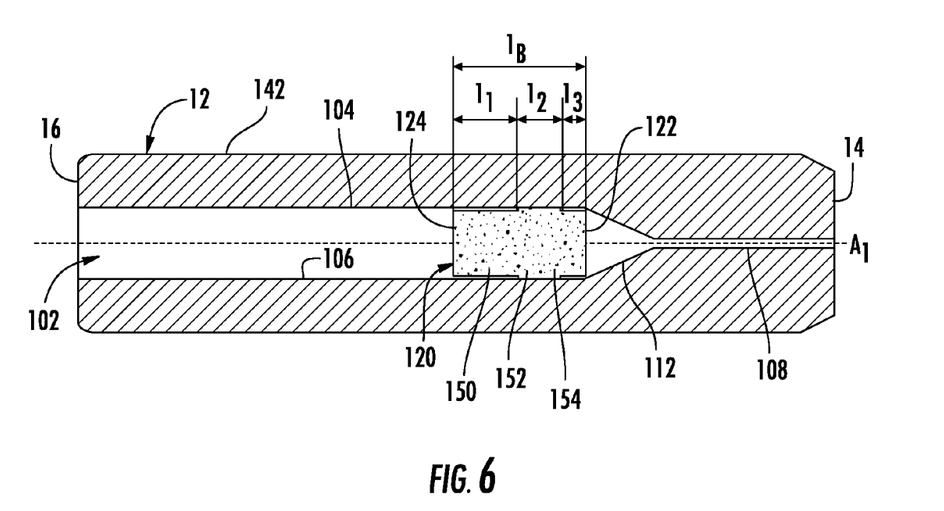
FIG. 6 is a cross-sectional view similar to FIG. 4, schematically illustrates some of the bonding agent having been melted and solidified to bond to an inner surface of the ferrule bore.

The heating process ultimately results in at least some of the bonding agent 120 melting. The melted bonding agent is then cooled (passively or actively) so that it solidifies. FIG. 6 schematically illustrates the bonding agent 120 including first, second, and third portions 150, 152, 154 following the heating and subsequent solidification. The first and third portions 150, 154 have not been affected by the heating process and thereby retain the initial cylindrical shape of the monofilament preform. The gap G (FIG. 4) remains present between the bonding agent 120 and inner surface 106 in the first and third portions 150, 154. The second portion 152, on the other hand, has been melted and solidified and thereby modified by the heating process. Advantageously, the second portion 152 bonds the bonding agent 120 to the inner surface 106 of the first section 104. There may not be any gap between the second portion 120 and first section 104, or there may be a gap that is different than the gap G due to some of the second portion having been melted and slightly changing shape.

It should be emphasized that the arrangement of the bonding agent 120 schematically illustrated in FIG. 6 is merely an example. Which portion(s) of the bonding agent 120 are bonded to the ferrule bore 102 as a result of the heating process—and, therefore, modified from the initial cylindrical monofilament preform—will vary depending on how the bonding agent 120 is initially disposed in the ferrule 12 and how the ferrule 12 is heated. There may only be a single portion that has been melted to bond to the ferrule bore 102, or there may be multiple portions that have been melted to bond to the ferrule bore 102. Likewise, there may only be a single portion of the bonding agent 120 that is not affected by the heating process or otherwise retains the initial shape of the preform, or there may be a plurality of such portions.

To characterize some of the potential arrangements the bonding agent 120 may have when some of the bonding agent is bonded to the ferrule bore 102, FIG. 6 illustrates the bonding agent 120 having the first end 122, a second end 124, and an overall length $l_B$ between the first and second ends 122, 124. Additionally, the first portion 150 is shown as having a length $l_1$, the second portion 152 as having a length $l_2$, and the third portion 154 as having a length $l_3$. In some embodiments, the portion(s) of the bonding agent 120 remaining cylindrical define(s) at least 10% of the length $l_B$, at least 25% of the length $l_B$, or even at least 50% of the length $l_B$. Thus, in the example shown, this corresponds to $(l_2+l_3)>0.1*l_B$, $(l_2+l_3)>0.25*l_B$, or even $(l_2+l_3)>0.5*l_B$.

Advantageously, when the bonding agent 120 comprises a partially cross-linkable polymer resin, the heating of the bonding agent 120 may be carefully controlled to allow subsequent re-melting. For example, heating of the ferrule 12 may be controlled so that the melted bonding agent (e.g., the second portion 152 in the example shown in FIG. 6) does not irreversibly cross-link and/or end up with a high degree of crystallinity (e.g., a spherulipic crystallinity above 60%). As a specific example, the bonding agent 120 may be heated to above 250° C., above 270° C., or even above 285° C. but kept below 350° C., below 325° C., or even below 300° C. The heating need not be long; 10-30 seconds may be sufficient in some embodiments. Additionally, in some embodiments, the bonding agent 120 further comprises a coupling agent (see examples mentioned above), and the melting enables the coupling agent to covalently bond the partially cross-linkable resin to the ferrule 12. The ferrule 12 in such embodiments may comprise zirconia or another inorganic material, and the partially cross-linkable resin may not have functional groups which can react with inorganic surfaces. The coupling agent, however, comprises functional groups specifically capable of bonding covalently to inorganic materials and groups specifically capable of reacting with organic functional groups of the partially cross-linkable resin.

One of the advantages of the example process mentioned above is that the resulting fiber optic connector sub-assembly 130 not only has the bonding agent 120 more securely coupled to the ferrule bore 102, but also preserves the ability of the bonding agent 120 to form even greater adhesion properties at a later point in time. In particular, the irreversible cross-linking and greatest adhesion properties of the bonding agent 120 can be reserved for the cable assembly/termination process in which the fiber optic connector sub-assembly 130 is eventually used. During the eventual cable assembly process, the ferrule may not only be heated above the melting point of the bonding agent 120, but also above the cross-linking temperature that results in the bonding agent 120 irreversibly cross-linking and preventing re-melting.

Persons skilled in optical connectivity will appreciate additional variations and modifications of the elements disclosed herein. Such persons will also appreciate variations and modifications of the methods involving the elements disclosed herein. For example, although embodiments are described above where less than all of the bonding agent is melted and solidified when forming a fiber optic connector sub-assembly, in alternative embodiments all or substantially all of the bonding agent may be melted and solidified. In addition, skilled persons will appreciate alternatives where some of the steps described above are performed in different orders. To this end, where a method claim below does not actually recite an order to be followed by its steps or it is not otherwise specifically stated in the claims below or description above that the steps are to be limited to a specific order, it is no way intended that any particular order be inferred.

What is claimed is:

1. A fiber optic connector sub-assembly, comprising:
   a ferrule having a front end, a rear end, and a ferrule bore extending between the front and rear ends, wherein the ferrule bore includes a micro-hole section; and
   a bonding agent disposed in the ferrule bore, wherein:
   the bonding agent comprises a partially cross-linkable polymer resin;
   at least a first portion of the bonding agent is in the form of an extruded monofilament;
   at least a second portion of the bonding agent has been melted and solidified to bond to the ferrule bore;
   the at least a second portion of the bonding agent can be re-melted and heated above a cross-linking temperature to irreversibly cross-link and solidify;
   the bonding agent blocks the micro-hole section; and
   an optical fiber is not present in the ferrule bore such that the bonding agent must be re-melted to permit an optical fiber to be inserted into the micro-hole section of the ferrule bore.

2. The fiber optic connector sub-assembly of claim 1, wherein a gap is defined between an outer surface of the at least a first portion of the bonding agent and an inner surface of the ferrule bore that defines an inner diameter.

3. The fiber optic connector sub-assembly of claim 2, wherein the bonding agent blocks the ferrule bore except for the gap.

4. The fiber optic connector sub-assembly of claim 2, wherein the gap is less than 15% of the inner diameter.

5. The fiber optic connector sub-assembly of claim 2, wherein the gap is between 0.5-12% of the inner diameter.

6. The fiber optic connector sub-assembly of claim 2, wherein the gap is between 1-9% of the inner diameter.

7. The fiber optic connector sub-assembly of claim 2, wherein the gap is between 0.005-0.035 mm.

8. The fiber optic connector sub-assembly of claim 1, wherein:
   the micro-hole section of the ferrule bore extends inwardly from the front end of the ferrule;
   the ferrule bore includes a counter-bore section extending inwardly from the rear end of the ferrule and a transition section located between the counter-bore section and the micro-hole section;
   the counter-bore section includes the inner surface that defines the inner diameter; and
   the micro-hole section is cylindrical and defines a micro-hole diameter that is less than the inner diameter of the counter-bore section.

9. The fiber optic connector sub-assembly of claim 8, wherein the inner diameter of the counter-bore section is at least twice the micro-hole diameter.

10. The fiber optic connector sub-assembly of claim 8, wherein:

an axial length of the counter-bore section is greater than half of an axial length of the ferrule; and an axial length of the micro-hole section is greater than an axial length of the transition section and less than a third of the axial length of the ferrule.

11. The fiber optic connector sub-assembly of claim 1, wherein:

the bonding agent has a first end, a second end, and a length between the first and second ends; and the at least a first portion of the bonding agent that is cylindrical defines at least 10% of the length of the bonding agent.

12. The fiber optic connector sub-assembly of claim 11, wherein the at least a first portion of the bonding agent that is cylindrical defines at least 25% of the length of the bonding agent.

13. The fiber optic connector sub-assembly of claim 12, wherein the at least a first portion of the bonding agent that is cylindrical defines at least 50% of the length of the bonding agent.

14. The fiber optic connector sub-assembly of claim 13, wherein the at least a first portion of the bonding agent that is cylindrical defines at least 75% of the length of the bonding agent.

15. The fiber optic connector sub-assembly of claim 1, wherein the at least a second portion of the bonding agent can be re-melted.

16. The fiber optic connector sub-assembly of claim 15, wherein the at least a second portion of the bonding agent can be heated above a cross-linking temperature of the partially cross-linkable polymer resin to irreversibly cross-link and solidify.

17. The fiber optic connector sub-assembly of claim 1, wherein the partially cross-linkable polymer resin has melting point between about 250° C. and about 350° C.

18. The fiber optic connector sub-assembly of claim 1, wherein the partially cross-linkable polymer resin is one chemical species selected from the group consisting of a polyphenylene sulfide, a polyphyenylene oxide, a polyamide-imide, a liquid crystal polymer, a polyether ether ketone, and a cyclic olefin copolymer.

19. The fiber optic connector sub-assembly of claim 1, wherein the partially cross-linkable polymer resin comprises polyphenylene sulfide.

20. The fiber optic connector sub-assembly of claim 1, wherein:

the bonding agent further comprises a coupling agent; and the at least a second portion of the bonding agent has been melted and solidified so that the coupling agent covalently bonds the partially cross-linkable resin to the ferrule bore.

21. The fiber optic connector sub-assembly of claim 20, wherein the bonding agent comprises between about 0.1 to about 10 parts by weight of the coupling agent per 100 parts of the partially cross-linkable polymer resin.

22. The fiber optic connector sub-assembly of claim 20, wherein the coupling agent comprises a silane coupling agent.

23. The fiber optic connector sub-assembly of claim 1, wherein the bonding agent further comprises a coupling agent, and wherein the coupling agent bonds the partially cross-linkable polymer resin to the ferrule bore in the at least a second portion of the bonding agent.

* * * * *

UNITED STATES PATENT AND TRADEMARK OFFICE
CERTIFICATE OF CORRECTION

PATENT NO. : 10,451,814 B2
APPLICATION NO. : 15/686490
DATED : October 22, 2019
INVENTOR(S) : Adra Smith Baca et al.

Page 1 of 1

It is certified that error appears in the above-identified patent and that said Letters Patent is hereby corrected as shown below:

In the Claims

In Column 12, Line 7, Claim 18, delete "polyphyenylene" and insert -- polyphenylene --, therefor.

Signed and Sealed this
Twenty-fifth Day of February, 2020

Andrei Iancu
*Director of the United States Patent and Trademark Office*